Jan. 9, 1923. 1,441,606
F. S. SMITH.
APPARATUS FOR AND METHOD OF PROTECTING ARTICLES FROM CREEPING INSECTS.
FILED JAN. 14, 1922. 3 SHEETS-SHEET 1

INVENTOR
Franklin S. Smith
BY
Cyrus N. Anderson
ATTORNEY

Jan. 9, 1923. 1,441,606
F. S. SMITH.
APPARATUS FOR AND METHOD OF PROTECTING ARTICLES FROM CREEPING INSECTS.
FILED JAN. 14, 1922. 3 SHEETS-SHEET 2
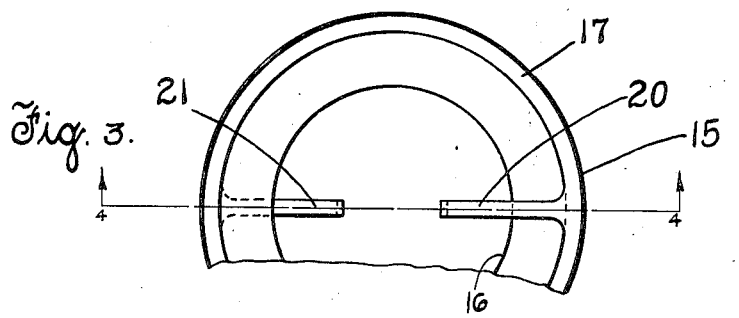
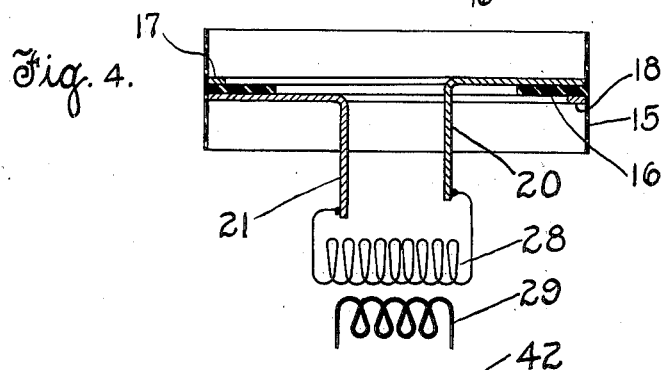
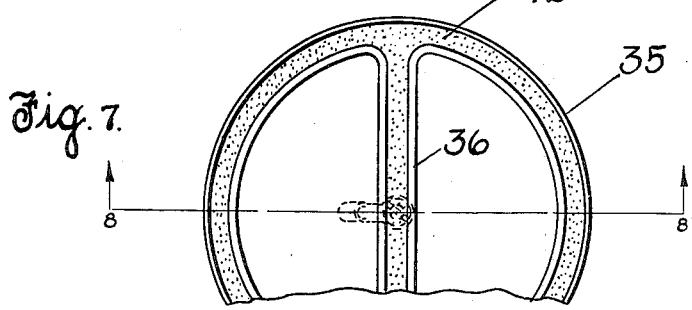
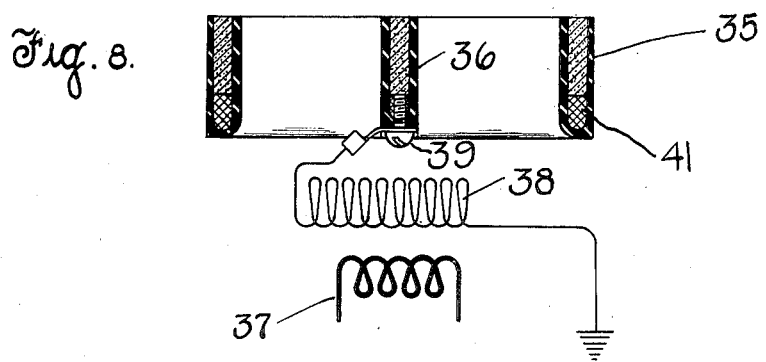
INVENTOR
Franklin S. Smith
BY
Cyrus N. Anderson
ATTORNEY Jan. 9, 1923. 1,441,606
F. S. SMITH.
APPARATUS FOR AND METHOD OF PROTECTING ARTICLES FROM CREEPING INSECTS.
FILED JAN. 14, 1922. 3 SHEETS-SHEET 3

INVENTOR
Franklin S. Smith
BY
Cyrus N. Anderson
ATTORNEY

Patented Jan. 9, 1923.

1,441,606

UNITED STATES PATENT OFFICE.

FRANKLIN S. SMITH, OF PHILADELPHIA, PENNSYLVANIA, ASSIGNOR TO THE PRODUCTS PROTECTION CORPORATION, OF NEW YORK, N. Y., A CORPORATION OF DELAWARE.

APPARATUS FOR AND METHOD OF PROTECTING ARTICLES FROM CREEPING INSECTS.

Application filed January 14, 1922. Serial No. 529,102.

*To all whom it may concern:*

Be it known that I, FRANKLIN S. SMITH, a citizen of the United States, and a resident of Philadelphia, in the county of Philadelphia and State of Pennsylvania, have invented an Improvement in Apparatus for and Methods of Protecting Articles from Creeping Insects, of which the following is a specification.
My invention relates to a new and useful apparatus for and method of protecting articles from creeping insects by the use of electricity. In the southern section of the United States and in tropical regions generally great difficulty is experienced in protecting articles from insects such as ants. Candy or other food is destroyed by them.

It is the object of my invention to provide both an apparatus and a method whereby electricity may be used as a means to protect candy or other food or other articles from the ravages and depredations of creeping insects.

In order to accomplish this result I establish in the path along which the insects must travel an electrostatic field.

In order that my invention may be more readily understood and its practical advantages fully appreciated, reference should be had to the accompanying drawings in which I have illustrated apparatus embodying the same and by means of which the method invented by me may be practised.

In the drawings:
Fig. 1 is a top plan view of the pedestal for supporting a table top;

Fig. 3 is a top plan view, somewhat enlarged, of an annular dielectric member shown in Figs. 1 and 2 with terminal devices associated therewith;

Fig. 4 is a transverse sectional view taken on the line 4—4 of Fig. 3;

Fig. 7 is a top plan view of a dielectric member with wax held therein shown in Figs. 5 and 6;

Fig. 8 is a transverse sectional view taken on the line 8—8 of Fig. 7, the grounding of the secondary coil of the transformer being indicated diagrammatically.

Figures 1, 2:
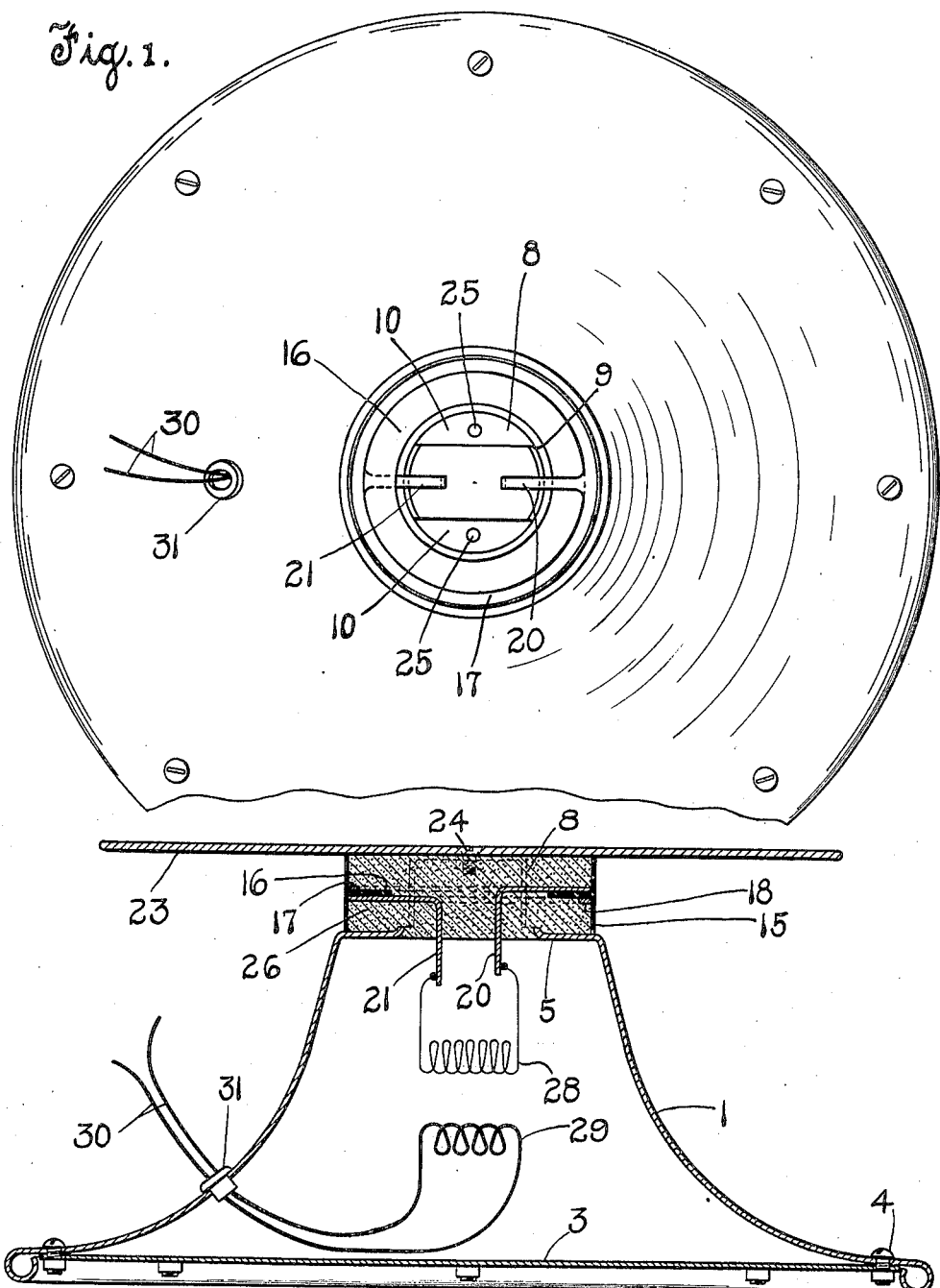
Fig. 2 is a central vertical section of the pedestal and a table top supported thereon.
Figures 5, 6:
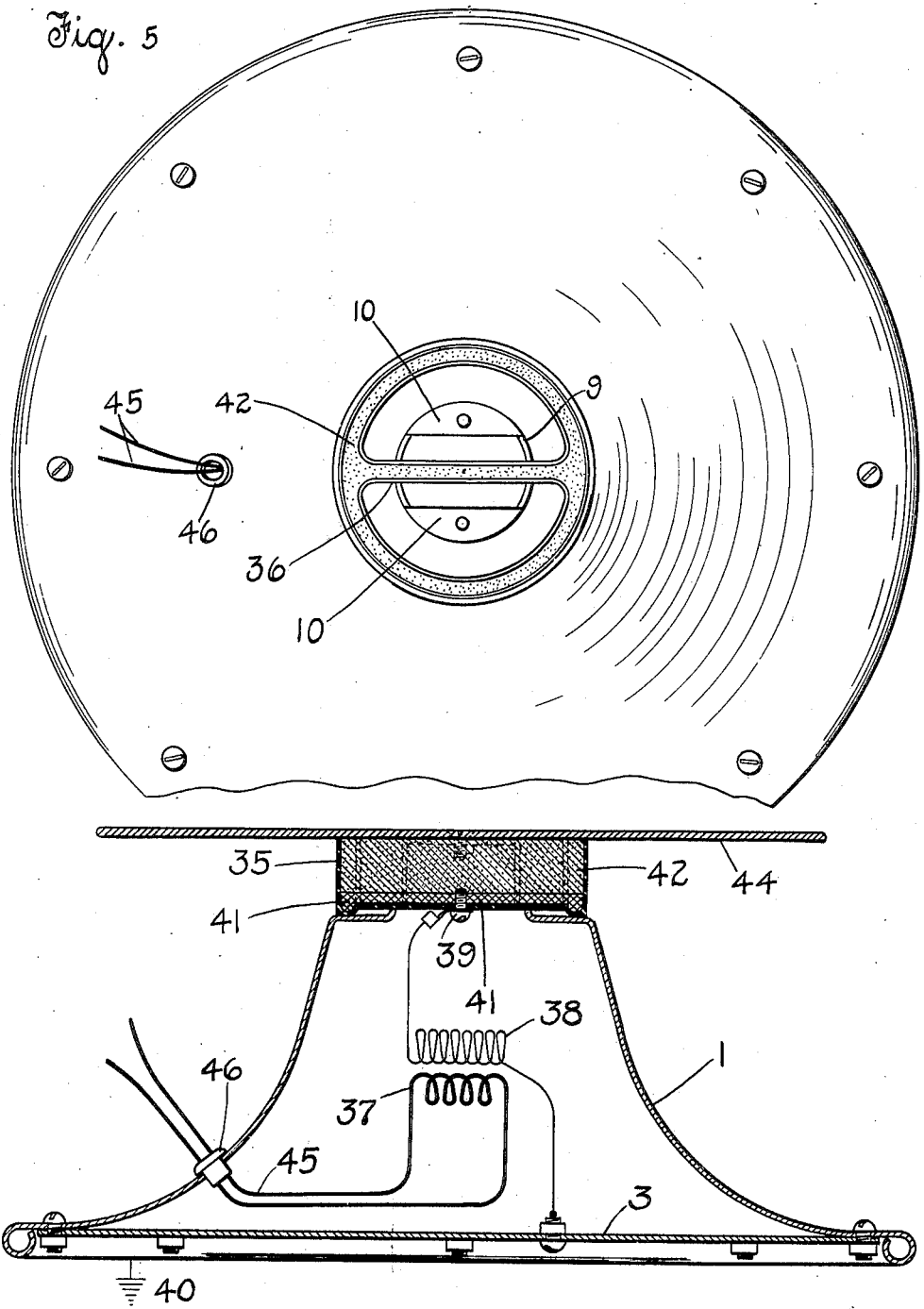
Fig. 5 is a top plan view of the pedestal showing a modified construction embodying the invention.
Fig. 6 is a central vertical sectional view of the pedestal shown in Fig. 5 with a table top supported thereon.

Referring to the drawings: 1 designates a tapered pedestal of sheet metal having its outer lower edges turned inwardly as indicated at 2, the lower side of which inwardly turned portion is adapted to rest upon a table or other suitable support. The bottom of the pedestal 1 is closed by means of a plate 3 secured to the lower outwardly flared portions thereof by means of bolts 4 as shown. The upper end portion of the pedestal 1 extends inwardly, as indicated at 5, and the said inwardly turned portion is provided with an upwardly extending central projection 8. A central vertical slot, as indicated at 9, is cut in the said upwardly extending projection leaving the upper end of the said projection partially closed by the segmental shaped portions 10, as is shown in Figs. 1 and 5 of the drawings.

Referring now to Figs. 1 to 4 inclusive of the drawings, 15 designates an annular member of suitable dielectic material, such as bakelite or bakelized fiber, having at about the center of its length an inwardly extending integral flange 16 of considerable width, as shown. Annular terminal members 17 and 18 are situated upon opposite sides of the inwardly extending flange 16. These members 17 and 18 with the flange 16 on the opposite sides of which they are situated constitute a condenser. The said condenser need not be circular as shown but may be of other desired shape or outline. The terminal member 17 is provided with an inwardly and downwardly extending projection 20 while the terminal member 18 is provided with a similar inwardly and downwardly extending projection 21. These projections extend to points below the plane of the inwardly turned portions 5 of the pedestal and terminate in the interior of the said pedestal as shown.

In the manufacture of the table shown in Figs. 1 to 4 inclusive the terminal members 17 and 18 are placed in position on opposite sides of the inwardly extending flange 16 of bakelite or other dielectric, as shown, and the parts thus assembled are placed in position upon the upper end portion of the pedestal 1. The assembled dielectric and the annular members 17 and 18 surround the projection of the pedestal 1 and the inwardly and downwardly extending projections 20 and 21 pass through the slots 9. The table top 23 is then placed in position upon the pedestal and secured thereto by means of screws 24 which engage screw threaded openings 25 in the parts 10. The pedestal with the table top thereon is then turned up side down and while the terminal members 17 and 18 are held in proper position in contact with the opposite sides of the flange 16 the chamber formed by the annular member 15 of dielectric material and the table top is filled with a suitable material, such as Montan wax 26. It will be understood that when this is being done the bottom 3 is not in place and that the said bottom is placed in position after the wax has been deposited in the said chamber.

The projections 20 and 21 are connected to the opposite sides of the secondary coil 28 of a step-up transformer, the primary coil of which is indicated at 29. This transformer is situated in the interior of the pedestal 1. Current is conducted to the primary of the transformer through the conducting wires 30 which enter the pedestal 1, at 31.

Refering now to Figs. 5 to 8 inclusive of the drawings, 35 designates an annular member of suitable dielectric material, such as bakelite, the said annular member being provided with an integral cross-wise extending portion 36. Said annular member as well as the cross-wise extending portion comprises two oppositely disposed walls connected so that in cross section they are of U-shape, as is clearly indicated in Fig. 8. 37 designates the primary coil of a step-up transformer and 38 the secondary coil thereof, one side of which is connected to a binding screw 39 which extends upwardly through the bottom of the cross-wise extending portion 36 and the opposite side thereof is connected to the bottom 3 of the pedestal. The pedestal is grounded, as indicated at 40. The screw 39, as already indicated, extends through the bottom of the cross-wise extending portion 36 and into the space between the opposite side walls of said portion. The screw having been inserted, molten lead or other suitable metal is poured into the space between the opposite side walls of the annular and cross-wise extending portions 35 and 36, which lead is indicated at 41. It will be seen that the screw is in engagement with the metal 41. The metal 41 in the said spaces is covered over and concealed by a suitable wax 42, such as Montan wax. The wax having been placed in the spaces as indicated and the member comprising the parts 35 and 36 having been placed in position upon the pedestal with the part 36 situated in the vertical slot 9, the table top 44 is secured to the parts 10 at the top of the pedestal 1. The presence of the said top retains the said member upon the pedestal. Current is supplied to the transformer through the conducting wires 45 which enter the pedestal at 46.

In actual practice the current is taken from the usual city supply which usually and generally consists of alternating current of one hundred and ten (110) volts. By means of the step-up transformer employed in the apparatus, this curent of relatively low voltage is transformed into current of high tension or voltage. I have found that a high tension alternating current of about four thousand volts produces the desired results and effects the ends desired to be accomplished.

Referring to the construction shown in Figs. 1 to 4, it will be understood that when the current is on an electrostatic field is produced within the dielectric 15 and 16, the wax 26 and in the air outside of the annular dielectric member 15 in opposed relation to the outer peripheral edges of the terminals 17 and 18.

In the construction as shown in Figs. 5 to 8 inclusive, an electrostatic field is in like manner formed or produced within the wax 42 and in the air within the region surrounding and in opposed relation to the outer peripheral edge of the lead 41 and surrounding the upper portion of the pedestal 1 in adjacent relation to the line or area of contact between the said pedestal and the lower edge of the annular dielectric member 35.

It will be seen, therefore, that in neither form of construction can creeping or crawling insects reach the table top 23 or 44, as the case may be, without passing through an electrostatic field surrounding the pedestal. By actual practice it has been demonstrated that such insects will not pass through an electrostatic field such as above described which surrounds any portion of a pedestal or support or other object, such, for instance, as the trunk of a tree.

Having thus described my invention, what I claim and desire to secure by Letters Patent is:

1. In a table in combination, a table top, a support therefor, a condenser surrounding the said support and means for supplying a high tension alternating electric current to said condenser.

2. The method of protecting articles from creeping insects, which consists in interposing a charged dielectric in the path which must be traveled by said insects to reach the said articles.

3. The method of protecting articles from creeping insects, which consists in interposing an electrostatic field in the path which must be traveled by said insects in order to reach the said articles.

4. The method of protecting articles from creeping insects, which consists in interposing a condenser in the path of said insects.

5. The method of protecting articles from creeping insects, which consists in interposing a dielectric field in the path of said insects.

In testimony that I claim the foregoing as my invention, I have hereunto signed my name this 10th day of January, A. D. 1922.

FRANKLIN S. SMITH.